United States Patent [19]

Arai et al.

[11] Patent Number: 5,576,758
[45] Date of Patent: Nov. 19, 1996

[54] ELECTRIC STILL CAMERA HAVING A DISPLAY FOR DISPLAYING AN IMAGE COMPRESSION RATIO

[75] Inventors: Minoru Arai; Kiyotaka Kaneko, both of Tokyo, Japan

[73] Assignee: Fuji Photo Film Co., Ltd., Kanagawa, Japan

[21] Appl. No.: 255,909

[22] Filed: Jun. 8, 1994

Related U.S. Application Data

[63] Continuation of Ser. No. 936,655, Aug. 28, 1992, abandoned.

[30] Foreign Application Priority Data

Aug. 30, 1991 [JP] Japan ................................ 3-246876

[51] Int. Cl.$^6$ ................................................ H04N 5/225
[52] U.S. Cl. ........................................... 348/220; 348/231
[58] Field of Search ............................. 348/220, 207, 348/231, 232; 358/335, 310, 906; H04N 5/225

[56] References Cited

U.S. PATENT DOCUMENTS

| | | | |
|---|---|---|---|
| 5,027,214 | 6/1991 | Fujimori | 358/209 |
| 5,032,927 | 7/1991 | Watanabe et al. | 358/335 |
| 5,067,029 | 11/1991 | Takahashi | 358/209 |
| 5,093,731 | 3/1992 | Watanabe et al. | 358/335 |
| 5,153,730 | 10/1992 | Nagasaki et al. | 358/209 |

*Primary Examiner*—Michael T. Razavi
*Assistant Examiner*—Tuan V. Ho

[57] ABSTRACT

A digital electric still camera is provided having a CCD image sensor and a memory card for recording digital image data of picture frames photographed by the CCD image sensor. The image data is compressed before being recorded, and the data compression rate is selectable by operating a picture mode button. The selected data compression rate is recorded along with the image data during photographing. When reproducing a picture frame on a monitor TV, the data compression rate is read together with the image data, so that the image data is expanded in correspondence to the data compression rate, and the data compression rate is displayed on a display device, such as a LCD panel provided on the digital electric still camera, in association with the serial number of the picture frame.

29 Claims, 4 Drawing Sheets

ELECTRIC STILL CAMERA HAVING A DISPLAY FOR DISPLAYING AN IMAGE COMPRESSION RATIO

This application is a continuation of application Ser. No. 07/936,655 filed on Aug. 28, 1992, now abandoned.

BACKGROUND OF THE INVENTION

1. Field of the Invention

The present invention relates to a digital electric still camera wherein image data is recorded in a memory card, and more particularly to a digital electric still camera wherein the data compression rate of the image data is displayed.

2. Related Art

In digital electric still cameras, a photoelectric image signal outputted from a CCD image sensor is converted into digital image data, and the digital image data is written in a memory medium. The conventional digital electric still cameras use a floppy disc or a memory card as the memory medium. Because the memory card stores image data in a digital form, the quality of the reproduced image is better than that read from the floppy disc. However, the conventional digital electric still cameras with the memory card have not had a reproducing function therein, and a separate reproducing device is therefore needed, in which the memory card is set for reproduction and is connected to a monitor device.

However, the conventional digital electric still cameras compress the image data in a data compression circuit in order to record as many picture frames as possible in one memory card. The data compression rate is manually selectable by a picture mode button, and the selected compression rate is displayed on a display of the camera during photographing.

Although a large data compression rate makes it possible to record a large number of picture frames in a single memory card, the quality of pictures is lowered, so that some photographic scenes may have a low quality which is too difficult to appreciate. On the contrary, if a smaller data compression rate is selected, the quality of pictures would be improved, but the total number of recordable picture frames per memory card becomes smaller.

For this reason, it is desirable and important to select a suitable compression rate depending on the photographic scene, in order to prevent the quality of reproduced pictures from lowering and to use the memory card economically.

However, in conventional digital electric still cameras, the data compression rate of image data recorded in the memory card is not displayed during the reproduction, so that the photographer cannot quickly realize or master which data compression rate is suitable for an individual scene to be photographed.

SUMMARY OF THE INVENTION

In view of the foregoing, a primary object of the present invention is to provide a digital electric still camera wherein the photographer can easily recognize the data compression rate of the recorded picture frame during the reproduction.

To achieve the above and other objects, the present invention provides a digital electric still camera wherein the data compression rate is recorded in the memory card, concurrently with recording the image data compressed at that data compression rate in the memory card. The electric still camera further has a reproducing function, and a display device for displaying the data compression rate read out from the memory card during the reproduction of the image data.

According to the present invention, it becomes possible to recognize the data compression rate of a picture frame reproduced on a monitor TV. Therefore, the photographer can learn from the reproduced photographic scenes the optimum data compression rate for various scenes, and can select a suitable data compression rate during photographing.

When the electric still camera has a reproducing function, the present invention provides a display for displaying the data compression rate. Therefore, it is possible to recognize the data compression rate of the image data recorded in the memory card, without the need for using a separate reproducing device.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS OF THE PRESENT INVENTION

Figure 1:
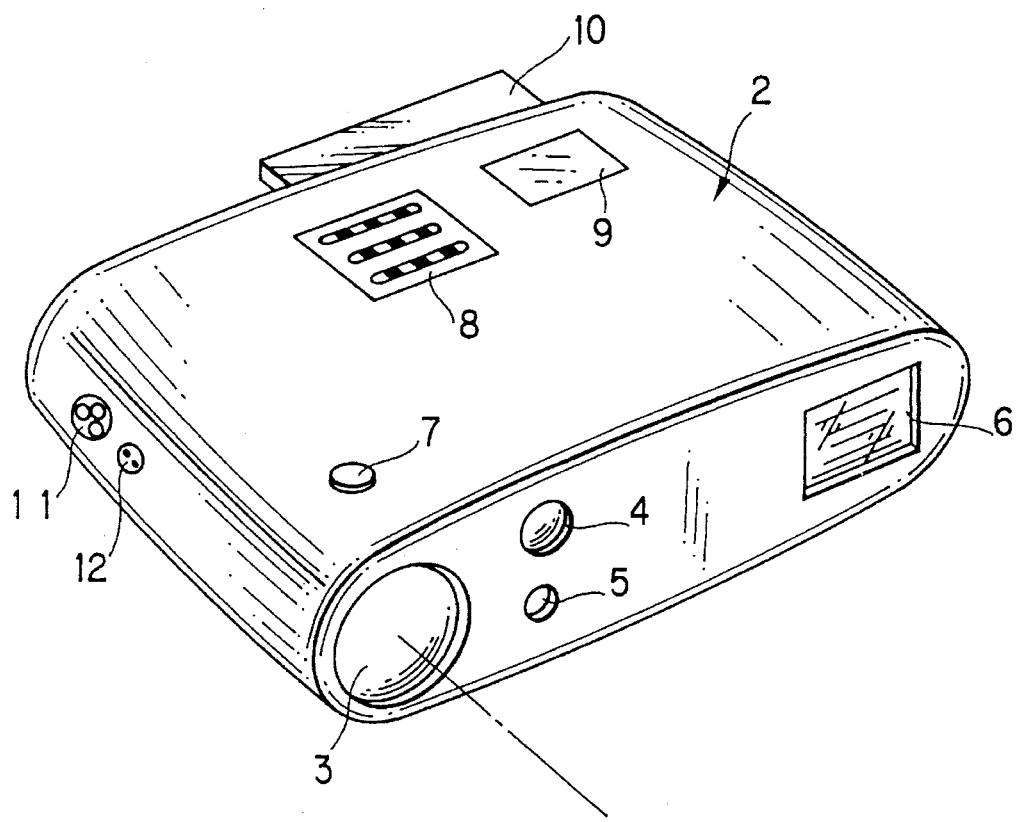
FIG. 1 is a perspective view of a digital electric still camera according to an embodiment of the present invention.

FIG. 1 shows an electric still camera 2 according to an embodiment of the present invention. The electric still camera 2 has functions to record photographic pictures and reproduce the pictures. A taking lens 3, a view finder window 4, a white balance window 5 and a flash window 6 are disposed on the front of the still camera 2. A release button 7, an operation unit 8 and an LCD panel 9 are disposed on the top of the camera 2. A memory card 10, into which IC memories are incorporated, is attached to the rear of the electric still camera 2, for recording a video signal as digital image data. Connectors 11 and 12 are disposed on one side of the camera 2. The connector 11 is used for outputting the video signal to a monitor TV through a code. The connector 12 is used for connecting the camera 2 to an external power source.

Figure 2:
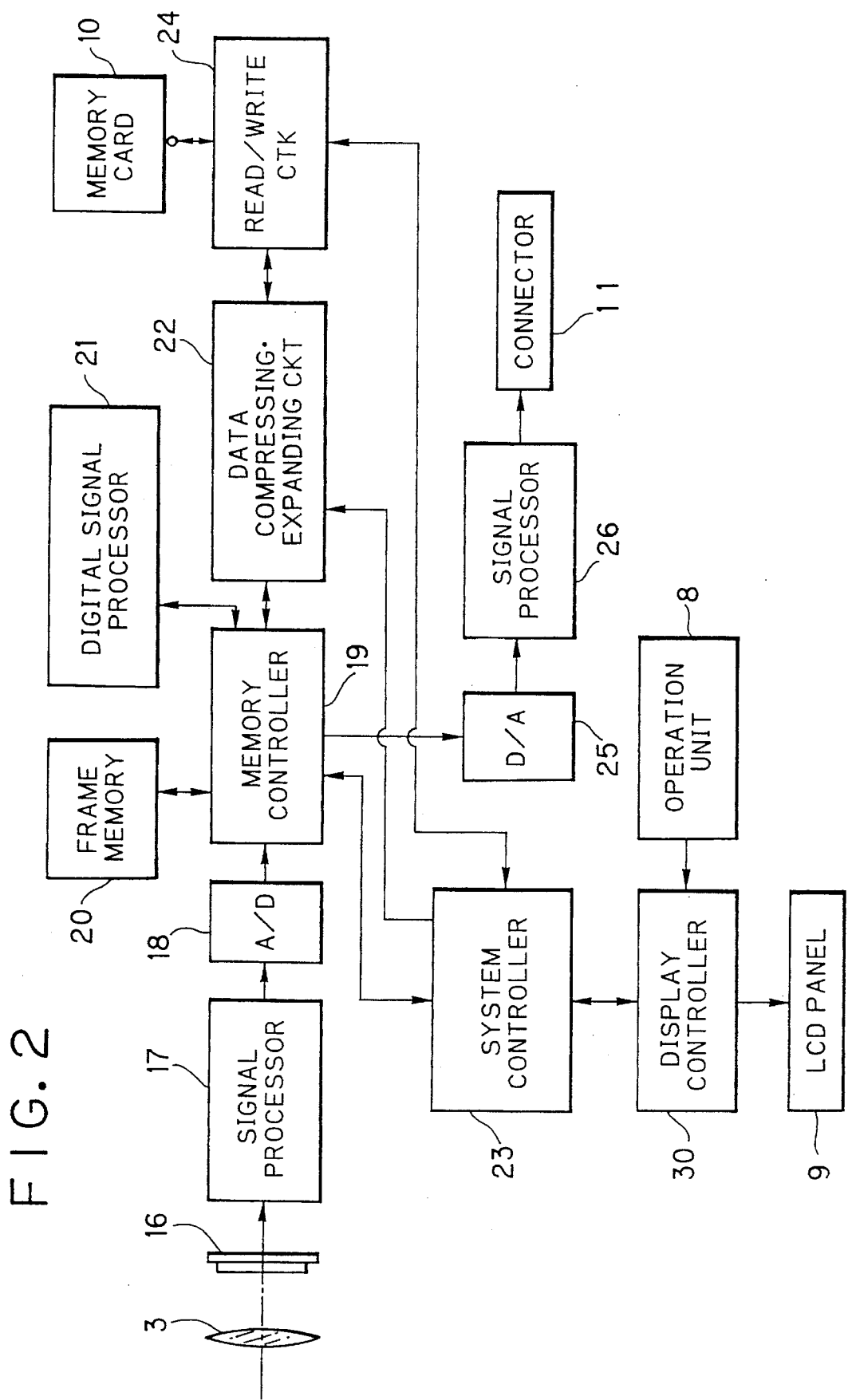
FIG. 2 is a block diagram of the electric still camera of FIG. 1.

Referring to FIG. 2 showing the electric construction of the electric still camera 2, a CCD image sensor 16 is disposed behind the taking lens 3, and is connected to a signal processor 17 for processing a photoelectric image signal from the CCD image sensor 16. For example, the signal processor 17 amplifies the image signal and subjects the image signal to gamma-correction. The signal processor 17 is connected to a frame memory 20 through an analog/digital converter (hereinafter referred to as an A/D converter) 18 and a memory controller 19. The A/D converter 18 converts the image signal into a digital form, and the memory controller 19 temporarily writes the digital signal in the frame memory 20, for example, in a sequence of serial scanning.

The memory controller 19 is connected to a digital signal processor and a data compressing-expanding circuit 22. The digital signal processor 21 converts the digital image signal stored in the frame memory 20 into image data and writes the image data in the frame memory 20 again. Thereafter, the memory controller 19 sends the image data from the frame memory 20 to the data compressing-expanding circuit 22 which compresses the image data in a recording mode, and expands the image data in a reproduction mode. The data compressing-expanding circuit 22 is connected to a system controller 23 which totally controls the electric still camera 2. The system controller 23 controls the data compressing-expanding circuit 22, so as to perform compression of the image data according to a selected picture mode which is selected, for example, from an economy mode "E", a normal mode "N" and a fine mode "F", when taking pictures, that is, during the recording mode. The compression ratio of these modes "E", "N" and "F" are 4:2:1, respectively. The image data compressed in this way is written in the memory card 10 through a read/write circuit 24.

Figure 3:
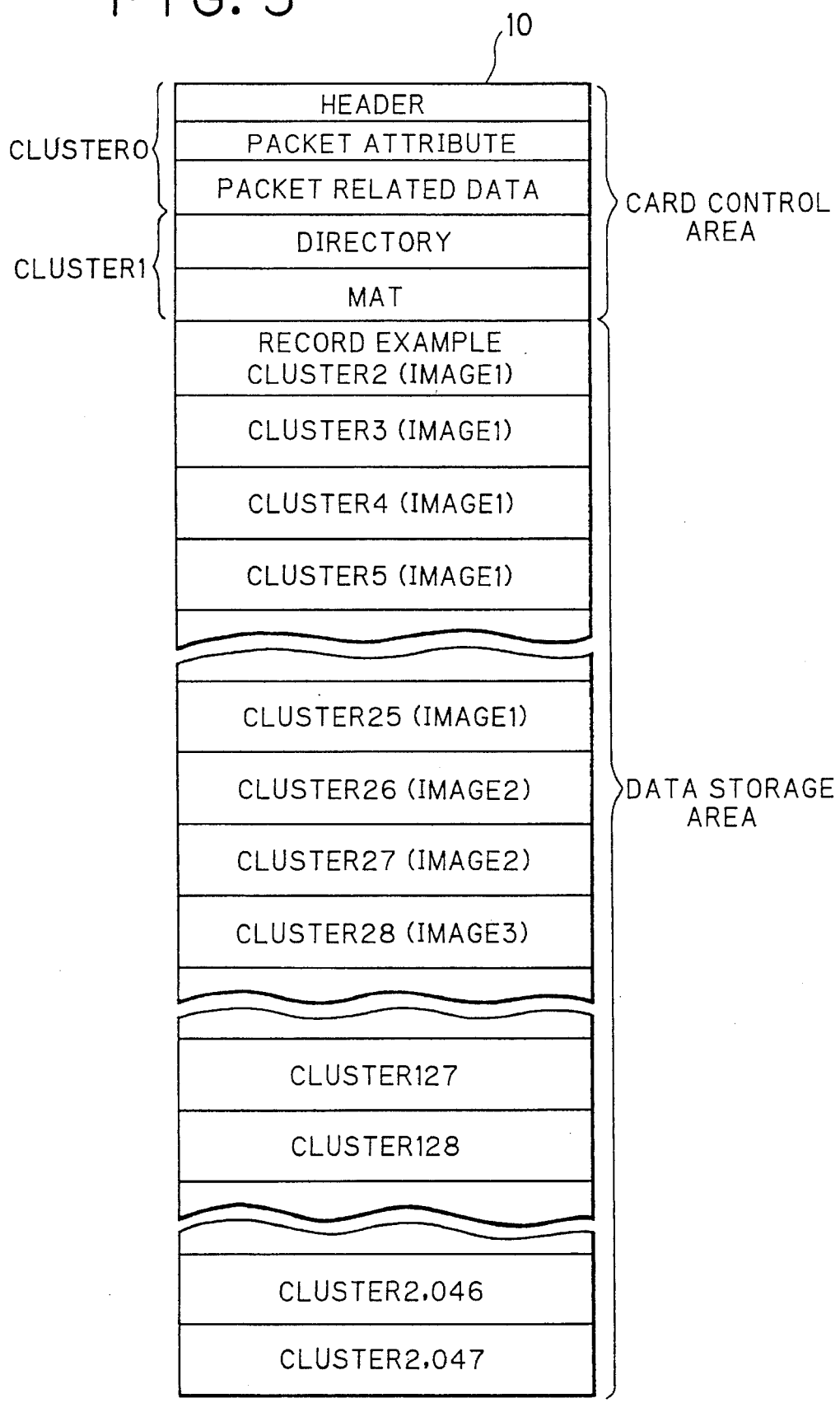
FIG. 3 is an explanatory view of memory areas of a memory card attached to the electric still camera illustrated in FIGS. 1 and 2.

FIG. 3 illustrates an example of the memory area of the memory card 10. The memory area of the memory card 10 is divided into many clusters, each of which provides a storage unit. Each cluster has a predetermined capacity, for example, 8 kbit. The memory area can be sectioned into a card control area and a data storage area. The cluster No. 0 and the cluster No. 1 are allocated to the card control area. The data storage area stores the image data, and the card control area stores control data for controlling the storage of the image data.

A group of clusters consisting of a plurality of clusters necessary for storing a frame of the picture, is hereinafter called a packet. The number of clusters belonging to a packet is not constant, but is an integer which varies according to the picture mode. For example, a packet in the fine mode "F" consists of 24 clusters, a packet in the normal mode "N" consists of 12 clusters, and a packet in the economy mode "E" consists of 6 clusters.

The control data stored in the card control area includes a header, a packet attribute, packet related data, a directory and a MAT (Memory Allocation Table). The header includes a format number, a card number, the number of unrecorded clusters, the number of recorded clusters, the number of the finally recorded packet having the largest number of the packets which have been stored in the data storage area, the initial empty cluster number that indicates the smallest number of the unrecorded clusters in the data storage area, parity check data for checking the content of data, a card label and optional data. The packet number corresponds to the number of the frame stored in the packet, and a serial number which is given to each picture frame in accordance with the time sequence of recording. When the image data of a picture frame is erased from the data storage area, the packet numbers are rewritten so as to restore the serial continuation thereof.

The packet attribute includes data directed to the usage of the packets, the availability for over-writing in the packet or for reading out from the packet, and other data. The packet attribute data are stored, for example, in a bit map method. The directory includes leading cluster numbers, each of which indicates the number of the leading clusters of each packet and is stored in the order of the packet number. The MAT includes the numbers of the clusters associated with each leading cluster. For example, if the image data of a picture frame having a packet number "12" is recorded in the clusters Nos. 23, 24, 30 and 40, the leading cluster number "23" of the packet "12" is retrieved from the directory, and then the cluster numbers "24", "30" and "40" are retrieved based on the MAT, associated with the leading cluster number "23". The memory address of the clusters in the data storage area is definitely determined for each cluster.

The read/write circuit 24 is controlled by the system controller 23 so as to read out the number of unrecorded clusters from the memory card 10 and to output that number to the system controller 23, when the picture mode is changed over. The number of unrecorded clusters is divided by the number of clusters necessary for recording a picture frame in the selected picture mode, so as to calculate the number of frames that can still be recorded. The number of recordable frames is displayed on the LCD panel 9 through a display controller 30.

The read/write circuit 24 reads out the number of clusters relating to the packet designated in the reproduction mode, as well as the image data from all the related clusters of the designated packet. The number of related clusters is temporarily stored in the system controller 23 and the image data is temporarily stored in the frame memory 20 through the data compressing-expanding circuit 22 and the memory controller 19. The image data stored in the frame memory 20 is read out again by the memory controller 19 and is sent to a second signal processor 26 through a digital/analog converter (hereinafter referred to as a D/A converter) 25. Thereby, the image data is converted into the video signal to be outputted through the connector 11.

Figure 4:
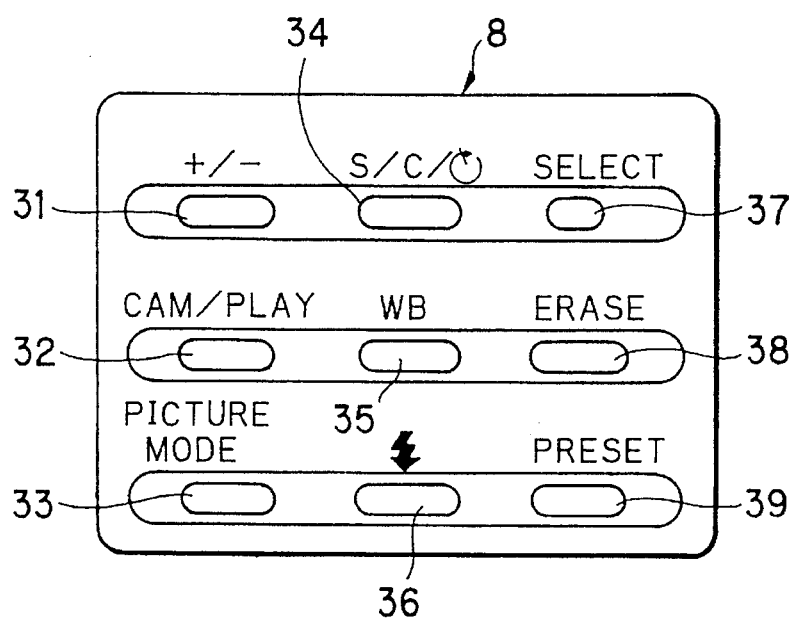
FIG. 4 shows an example of an operation unit of the electric still camera illustrated in FIG. 1.

As shown in FIG. 4, the operation unit 8 is provided with a "±" button 31 for exposure correction, a "CAM/PLAY" button 32 for changing over between the recording mode and the reproduction mode, a picture mode button 33 for selecting one of the picture modes "F", "N" and "E", and a button 34 for selecting a single-frame mode "S", a continuous photography mode "C" or a self-timer mode. The operation unit 8 is also provided with a WB button 35 for executing white balance measurement through the white balance window 5, a flash button 36, a "SELECT" button 37 for executing one-frame advance in the reproduction mode, an erase button 38 for erasing the stored image data, and a preset button 39 for turning the power source ON so as to make the electric still camera 2 ready for photographing. In the white balance measurement, the CCD image sensor 16 receives light passing through the white balance window 5 and the CCD image sensor 16 is shielded from light passing through the taking lens 3, so that the white balance may be accurately determined. These buttons 31 to 39 are constructed, for example, with rubber-contact switches.

The respective switching conditions of the buttons 31 to 39 are set by using a default function of the display controller 30, and are cyclically changed over upon each depression of one of the buttons. For example, when the preset button 39 is switched on to turn the power source ON, the picture mode is set at the normal mode "N". Thereafter, each time that the picture mode button 33 is depressed, the picture mode is cyclically changed over from the normal mode to the economy mode, from the economy mode to the fine mode, and from the fine mode to the normal mode, and so forth. It is to be noted that, even if the picture mode button 33 is depressed in the reproduction mode, such a command is regarded as ineffective, and an alarm sounds for 0.5 seconds.

Figure 5:
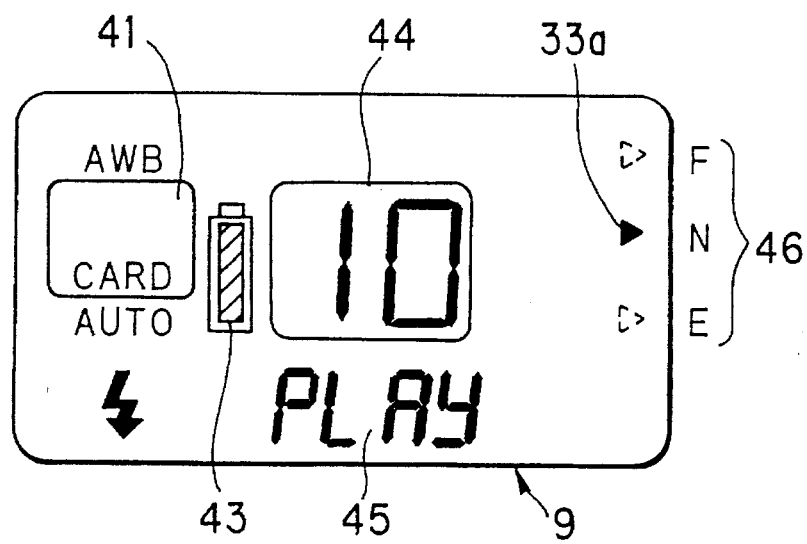
FIG. 5 shows an example of a display on a liquid crystal display panel of the electric still camera illustrated in FIG. 1 in a reproduction mode.
Figure 6:
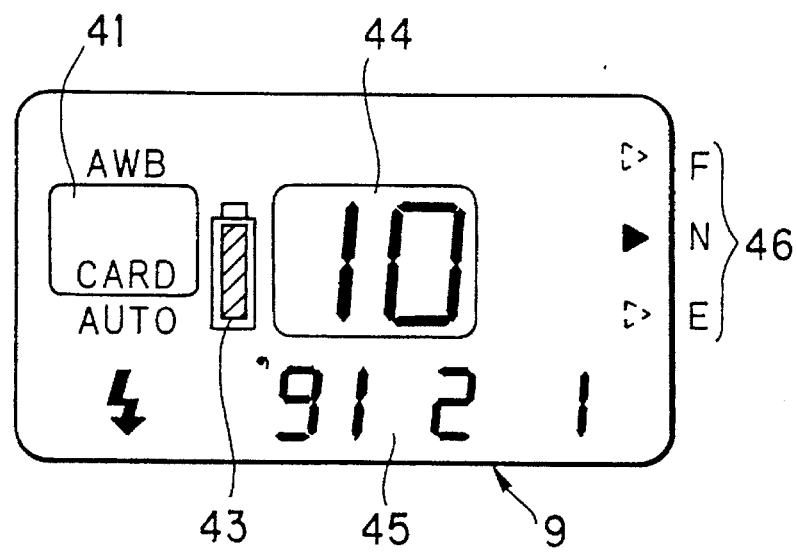
FIG. 6 shows an example of a display on the LCD panel of the electric still camera illustrated in FIG. 1 in a recording mode.

FIG. 5 shows an example of the display of the LCD panel in the reproduction mode, and FIG. 6 shows an example of the display of the LCD panel in the recording mode. The LCD panel 9 is provided with a card display segment 41, a battery display segment 43, a frame number display segment 44, a date display segment 45, a picture mode display segment 46 and other segments. The card display segment 41 displays a character mark "CARD" when the memory card 10 is attached to the electric still camera 2. The battery display segment 43 displays whether a battery built in the memory card 10 is sufficiently charged.

The frame number display segment 44 ordinarily displays the present frame number. However, as set forth above, immediately after the picture mode button 33 is operated in the recording mode, the number of recordable frames is displayed in the frame number display segment 44, for several seconds. The date display segment 45 displays the present date (year, month and day) in the recording mode, as shown in FIG. 6, and displays a character mark "PLAY" in the reproduction mode, as shown in FIG. 5. The picture mode display segment 46 displays an index mark 33a in one of the index positions "F", "N" and "E", which corresponds to the picture mode selected by the picture mode button 33, wherein the index positions "F", "N" and "E" correspond to the fine, normal and economy modes, respectively.

The operation of the above-described electric still camera 2 is as follows:

When the power source is turned ON by operating the preset button 39, the LCD panel 9 is set at the state shown in FIG. 6 according to the default function of the display controller 30, and the electric still camera 2 is set in the recording mode. When the release button 7 is depressed in this state, a shutter (not shown) of the electric still camera 2 is released to take a picture of a subject by the CCD image sensor 16 in the normal mode. If the photographer wishes to take pictures in the economy mode or the fine mode, the picture mode button 33 is depressed before the shutter release. The photographic signal from the CCD image sensor 16 is converted into digital data through the first signal processor 17 and the A/D converter 18, and is temporarily written in the frame memory 20 by the memory controller 19.

The data stored in the frame memory 20 is processed by the digital signal processor 21 to be converted into image data, and the video data is again stored in the frame memory 20. The memory controller 19 reads out the video data and sends the same to the data compressing-expanding circuit 22, which then compresses the image data at a compression rate for the normal mode, in this instance. The compressed image data is sent to the read/write circuit 24, which writes the packet number that corresponds to the frame number displayed in the frame number display segment 44, that is "10" in this instance, in the card control area of the memory card 10, and concurrently, the compressed video data in the data storage area.

The same operation is repeated for each picture frame. When all of the clusters have been recorded or employed, the frame number display segment 44 displays a distance mark "END" which indicates that it is impossible to take any more pictures.

When reproducing video data written in the memory card 10 on a monitor TV, first the connector 11 is connected to the monitor TV through a code. Next, the "CAM/PLAY" button 32 is depressed to change over the electric still camera 2 from the recording mode to the reproduction mode. Then, the system controller 23 drives the read/write circuit 24 to read out the number of clusters relating to the packet No. 1 and the video data stored in these related clusters from the memory card 10. In this instance, the packet number "1" and the number of clusters "24" relating to the packet NO. 1 are sent to the display controller 30. The display controller 30 controls the LCD panel 9 to display the frame number "1" in the frame number display segment 44 based on the packet number "1", and displays the index mark 33a at the fine mode index position "F" in the picture mode display segment 46, based on the number of related clusters, that is, "24".

The image data read out by the read/write circuit 24 is expanded by the data compressing-expanding circuit 22, and thereafter, is written in the frame memory 20 through the memory controller 19. The memory controller 19 again reads the frame memory 20 so as to send the image data to the second signal processor 26 through the D/A converter 25. The second signal processor 26 converts the image data into the video signal which is sent to the monitor TV through the connector 11, so as to display the image of the frame No. 1 on the monitor TV.

When the "SELECT" button 37 is operated in this state, the read/write circuit 24 reads out the number of clusters relating to the next packet No. 2 and the image data stored in all of the clusters relating to the packet No. 2 from the memory card 10. As a result, the monitor TV displays the image of the frame No. 2, and the frame number display segment 44 displays the number "2". If, for example, the packet No. 2 consists of 12 clusters, the index mark 33a is displayed in the normal mode index position "N" of the picture mode display segment 46. When the frame No. 10 is displayed on the monitor TV in this way, the LCD panel 9 displays the state as shown in FIG. 5.

Although the present invention has been described with reference to the embodiment shown in the drawings, it will be understood that the present invention is not intended to be limited to the above-described embodiment but, on the contrary, various modifications of the invention can be effected without departing from the scope and spirit of the appended claims.

What is claimed is:

1. A digital electric still camera comprising:

a solid state imaging device for photographing an image;

a memory for storing digital image data of at least one picture frame photographed by said solid state imaging device;

data compressing means for compressing said digital image data;

data compression rate setting means for setting a data compression rate of said data compressing means during recording;

writing means for writing said data compression rate, corresponding to said digital image data compressed at said data compression rate, in said memory;

reading means for reading out digital image data of a picture frame, along with a data compression rate corresponding thereto, from said memory;

processing means, responsive to the reading means, for processing said digital image data based on said data compression rate corresponding thereto and developing a video signal reproduction of the picture frame; and display means, responsive to the processing means and to the reading means, for displaying the video signal reproduction of the picture frame and for displaying, in association therewith, the compression rate corresponding thereto which was read from the memory.

2. A digital electric still camera as recited in claim 1, wherein said display means displays said data compression rate of said digital image data along with a serial number of said picture frame reproduced based on said digital image data.

3. A digital electric still camera as recited in claim 1, wherein said display means comprises a liquid crystal display panel.

4. A digital still camera as in claim 1, wherein:
the display means also displays the data compression rate in association with the picture frame during recording.

5. A digital still camera as in claim 1, wherein:
the display means also displays indicating information for indicating whether the camera is in a recording mode or a reproduction mode.

6. A digital electric still camera as in claim 1, wherein the memory comprises:
an integrated circuit memory card.

7. A digital electric still camera as in claim 1, wherein:
the memory is partitioned into a plurality of clusters;
digital image data for each picture frame is stored as a packet;
each packet comprising a predetermined number of clusters.

8. A digital electric still camera as recited in claim 7, wherein said data compression rate setting means selects one of a plurality of predetermined data compression rates.

9. A digital electric still camera as recited in claim 8, wherein the number of clusters in each said packet is predetermined for each of said plurality of predetermined data compression rates, and one of said plurality of predetermined data compression rates selected by said data compression rate setting means is written in said memory card as the number of clusters of said packet for storing said digital image data.

10. A digital electric still camera as recited in claim 7, wherein said reading means reads out said digital image data and the number of clusters of said packet that stores said digital image data, and detects said data compression rate of said digital image data based on the cluster number read.

11. A digital electric still camera as recited in claim 10, wherein said processing means expands said digital image data at an expanding rate that corresponds to a read data compression rate based on the cluster number read.

12. A digital electric still camera as recited in claim 7, further comprising:
recording means for recording a present number of unrecorded clusters in said memory; and
calculating means for calculating a number of still recordable picture frames based on said data compression rate set by said data compression rate setting means and said present number of unrecorded clusters,
wherein said display means displays said number of still recordable picture frames every time said data compression rate is changed during photographing.

13. A digital electric still camera as in claim 1, wherein:
the memory stores at least two picture frames, at least each of the two picture frames having been compressed at different compression rates; and
wherein without intervening picture taking, the reading means, the processing means, the display means cooperate to display the at least two pictures and, in association therewith, the compression rates corresponding thereto, respectively.

14. A digital electric still camera comprising:
a solid state imaging device for photographing an image;
a memory for storing digital image data of at least one picture frame photographed by said solid state imaging device;
data compressing means for compressing said digital image data;
data compression rate setting means for setting a data compression rate of said data compressing means during recording;
writing means for writing said data compression rate corresponding to said digital image data compressed at the data compression rate in said memory;
reading means for reading out digital image data of a picture frame along with a data compression rate corresponding thereto from said memory;
processing means, responsive to the reading means, for processing said digital image data based on said data compression rate corresponding thereto and developing a video signal reproduction of the picture frame; and
display means, responsive to the processing means and to the reading means, for displaying the video signal reproduction of the picture frame and for displaying, in association therewith, the compression rate corresponding thereto which was read from the memory.

15. A digital still camera as in claim 14, wherein:
the display means also displays the data compression rate in association with the picture frame during recording.

16. A digital still camera as in claim 14, wherein:
the display means also displays indicating information for indicating whether the camera is in a recording mode or a reproduction mode.

17. A digital electric still camera as in claim 14, wherein the memory comprises:
an integrated circuit memory card.

18. A digital electric still camera as in claim 14, wherein:
the memory stores at least two picture frames, at least each of the two picture frames having been compressed at different compression rates; and
wherein without intervening picture taking, the reading means, the processing means, and the display means cooperate to display at least two pictures and, in association therewith, the compression rates corresponding thereto, respectively.

19. A method for recording a digital image by a digital electric still camera, comprising the steps of:
(a) photographing an image;
(b) storing digital image data of a picture frame in a memory;
(c) setting a data compression rate;
(d) compressing said digital image data at said data compression rate set at said step (c) during recording;
(e) writing said data compression rate corresponding to said digital image data into the memory;
(f) reading out digital image data of a picture frame along with the data compression rate corresponding thereto from said memory;
(g) processing said digital image data based on said data compression rate corresponding thereto;
(h) developing a video signal reproduction of said picture frame; and (i) displaying the video signal reproduction of the picture frame and, in association therewith, the compression rate corresponding thereto which was read from the memory.

20. A method for recording a digital image as recited in claim 19, wherein said data compression rate of said digital image data is displayed along with a serial number of said picture frame reproduced based on said digital image data at said step (i).

21. A method as in claim 19, wherein:

the memory is partitioned into a plurality of clusters;

digital image data for each picture frame is stored as a packet;

each packet comprising a predetermined number of clusters.

22. A method for recording a digital image as recited in claim 21, wherein said data compression rate is set by selecting one of a plurality of predetermined data compression rates at said step (c).

23. A method for recording a digital image as recited in claim 22, wherein the number of clusters in each said packet is determined for each of said plurality of predetermined data compression rates and the one of said plurality of predetermined data compression rates selected at said step (c) is written in said memory card as the number of clusters of said packet for storing said digital image data.

24. A method for recording a digital image as recited in claim 21, wherein said digital image data and the number of clusters of said packet that stores said digital image data is read out and said data compression rate of said digital image data is detected based on the number of clusters of the datapacket that was read.

25. A method for recording a digital image as recited in claim 24, wherein said digital image data is expanded at an expanding rate that corresponds to a read data compression rate based on the number of clusters of the datapacket that was read.

26. A method for recording a digital image as recited in claim 21, further comprising the steps of:

(j) recording a present number of unrecorded clusters in said memory card;

(k) calculating a number of still recordable picture frames based on said data compression rate set at said step (c) and said present number of unrecorded clusters; and (l) displaying said number of still recordable picture frames every time said data compression rate is changed during photographing.

27. A method as in claim 19, wherein:

storing at least two picture frames in the memory, at least each of the two picture frames having been compressed at different compression rates; and wherein without intervening picture taking, the steps (f)–(i) are performed at least twice such that at least two pictures and, in association therewith, the compression rates corresponding thereto, respectively, are displayed.

28. A method as in claim 19, wherein the step (i) of displaying also includes:

($i_1$) displaying the data compression rate in association with the picture frame during recording.

29. A method as in claim 19, wherein the step (i) of displaying also includes:

($i_1$) displaying indicating information for indicating whether the camera is in a recording mode or a reproduction mode.

* * * * *